(12) United States Patent
Seshadri et al.

(10) Patent No.: US 10,478,775 B2
(45) Date of Patent: Nov. 19, 2019

(54) METAL CAPTURE IN A FLUE GAS USING SORBENT INJECTION

(71) Applicant: THE BABCOCK & WILCOX COMPANY, Barberton, OH (US)

(72) Inventors: Prasanna Seshadri, Akron, OH (US); Richard DeVault, Barberton, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 35 days.

(21) Appl. No.: 15/653,696

(22) Filed: Jul. 19, 2017

(65) Prior Publication Data
US 2018/0028968 A1 Feb. 1, 2018

Related U.S. Application Data

(60) Provisional application No. 62/369,428, filed on Aug. 1, 2016.

(51) Int. Cl.
*B01D 53/64* (2006.01)
*B01D 53/14* (2006.01)
(Continued)

(52) U.S. Cl.
CPC ......... *B01D 53/64* (2013.01); *B01D 53/1437* (2013.01); *B01D 2251/404* (2013.01);
(Continued)

(58) Field of Classification Search
None
See application file for complete search history.

(56) References Cited

U.S. PATENT DOCUMENTS

| | | | | |
|---|---|---|---|---|
| 5,202,101 A | * | 4/1993 | Cohen | B01D 53/60 423/243.06 |
| 5,756,052 A | * | 5/1998 | Suzumura | B01D 53/501 422/171 |

(Continued)

OTHER PUBLICATIONS

Extended European Search Report dated Dec. 20, 2017 for EP Application No. 17184255.2.

*Primary Examiner* — Sheng H Davis
(74) *Attorney, Agent, or Firm* — Michael J. Seymour

(57) ABSTRACT

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for: (i) reducing the levels of one or more gas phase selenium compounds and/or one or more other RCRA metals, or RCRA metal compounds (regardless of whether such other RCRA metals or RCRA metal compounds are in the gas phase or some other phase); (ii) capturing, sequestering and/or controlling one or more gas phase selenium compound and/or one or more other RCRA metals, or RCRA metal compounds (regardless of whether such other RCRA metals or RCRA metal compounds are in the gas phase or some other phase) in a flue gas stream and/or in one or more pieces of emission control technology; and/or (iii) capturing, sequestering and/or controlling one or more gas phase selenium compound and/or one or more other RCRA metals, or RCRA metal compounds (regardless of whether such other RCRA metals or RCRA metal compounds are in the gas phase or some other phase) in a flue gas stream prior to desulfurization and/or in one or more pieces of emission control technology prior to one or more desulfurization units.

24 Claims, 4 Drawing Sheets

(51) Int. Cl.
  *B01D 53/50* (2006.01)
  *B01D 53/80* (2006.01)
(52) U.S. Cl.
  CPC ............... *B01D 2251/608* (2013.01); *B01D 2252/2056* (2013.01); *B01D 2253/1124* (2013.01); *B01D 2257/55* (2013.01); *B01D 2257/60* (2013.01); *B01D 2258/0283* (2013.01)

(56) References Cited

U.S. PATENT DOCUMENTS

| | | |
|---|---|---|
| 5,965,095 A | 10/1999 | Owens et al. |
| 2002/0009403 A1 | 1/2002 | Shimizu et al. |
| 2005/0039598 A1* | 2/2005 | Srinivasachar ........ B01D 53/10 95/134 |
| 2010/0055015 A1* | 3/2010 | Winschel ............ B01D 53/501 423/243.08 |
| 2010/0071348 A1* | 3/2010 | Kobayashi ............ B01D 53/10 60/276 |
| 2010/0116126 A1 | 5/2010 | Shimamura et al. |
| 2011/0268637 A1 | 11/2011 | Ukai et al. |
| 2012/0024194 A1 | 2/2012 | Minkara |

* cited by examiner

METAL CAPTURE IN A FLUE GAS USING SORBENT INJECTION

RELATED APPLICATION DATA

This patent application claims priority to and is non-provisional of U.S. Provisional Patent Application No. 62/369,428 filed Aug. 1, 2016 and titled "Metal Capture in a Flue Gas using Sorbent injection." The complete text of this patent application is hereby incorporated by reference as though fully set forth herein in its entirety.

FIELD AND BACKGROUND OF THE INVENTION

1. Field of the Invention

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for; (i) reducing the levels of one or more gas phase selenium compounds and/or one or more other RCRA metals, or RCRA metal compounds (regardless of whether such other RCRA metals or RCRA metal compounds are in the gas phase or some other phase); (ii) capturing, sequestering and/or controlling one or more gas phase selenium compound and/or one or more other RCRA metals, or RCRA metal compounds (regardless of whether such other RCRA metals or RCRA metal compounds are in the gas phase or some other phase) in a flue gas stream and/or in one or more pieces of emission control technology; and/or (iii) capturing, sequestering and/or controlling one or more gas phase selenium compound and/or one or more other RCRA metals, or RCRA metal compounds (regardless of whether such other RCRA metals or RCRA metal compounds are in the gas phase or some other phase) in a flue gas stream prior to desulfurization and/or in one or more pieces of emission control technology prior to one or more desulfurization units.

2. Description of the Related Art

As is known to those of skill in the art, fossil fuel-based electric plants that utilize steam to generate electric power discharge various substances into the environment including, but not limited to, arsenic (As), barium (Ba), cadmium (Cd), chromium (Cr), lead (Pb), mercury (Hg), selenium (Se) and/or silver (Ag). Many of these metals and/or RCRA metal compounds, once in the environment, remain there for years. Some of the current emission regulations relating to various allowable emission levels for some of these substances were last updated in 1982 and as a result do not adequately address various metal discharges.

New technologies for generating electric power and the widespread implementation of air pollution controls over the last 30 years have altered existing wastewater streams or created new wastewater streams at many power plants, particularly coal-fired plants. Given this, the 2015 EPA Finalized Rules address these changes in the power generating industry and in particular focuses on wastewater streams from various emission control technologies.

In light of various new guidelines such as the 2015 EPA Finalized Rules, one of the new Effluent Limit Guidelines (ELG) relates to the amount of Resource Conservation and Recovery Act (i.e., RCRA) metals that can be emitted in a wastewater stream. As such, it has become, or eventually will become, desirable to control the amount of one or more of arsenic (As), barium (Ba), cadmium (Cd), chromium (Cr), lead (Pb), mercury (Hg), selenium (Se) and/or silver (Ag) (collectively referred to as the RCRA metals) that is/are emitted in one or more wastewater streams generated during various emission control technologies. Various potential emission sources of one or more RCRA metals include one or more effluent streams, or wastewater streams, generated from one or more pieces of emission control technology utilized to clean the flue gas of various fossil fuel burning power plants (e.g., a coal-fired power plant). Given this, and in light of the newly proposed guidelines, only a certain concentration of each metal is permitted in waste, it has now become desirable to develop cost effective methods for capturing one or more of the RCRA metals. While not wishing to be bound to any one ELG Guideline, it is believed that the currently proposed, or even final, long-term average ELGs for various RCRA metals from wastewater from existing wet FGD units will be, or are, arsenic —5.98 µg/L; mercury —159 ng/L; and selenium —7.5 µg/L. It should be noted that other RCRA metal ELGs would apply to other emission control wastewater streams and/or other emission situations, and thus the above ELGs are to be viewed as exemplary and non-limiting.

While not wishing to be bound to any one theory, it is believed that gas phase selenium in combustion flue gases exists mainly as $SeO_2$. While it is known that some of the gaseous $SeO_2$ gets adsorbed on fly ash surfaces, much of the gas phase selenium will continue to remain in the gas phase and then enter one or more wet FGD scrubber units as selenium vapor. Also entering such one or more wet scrubber units will be any selenium that is present on any small particulate matter that may have passed through any upstream particulate control device (e.g., one or more electrostatic precipitators, one or more baghouses and/or any other type of particulate control technology). During the desulfurization process, the wet FGD scrubber further cools the flue gas thereby resulting in the condensation of one or more gas phase selenium compounds into the water and/or aqueous slurry present in the wet FGD unit. This in turn results in the eventual presence of one or more selenium compounds in any wastewater stream that is generated during the desulfurization process.

Again, while not wishing to be bound to any one theory, it is believed that the dominant oxidation forms of selenium within the wet FGD slurry and/or any wastewater stream therefrom are one or more selenite ($SeO_3^{2-}$) compounds and one or more selenate ($SeO_4^{2-}$) compounds, also referred to as selenium oxyanions. Depending on the speciated form of such selenium compounds (in particular the generally more water soluble selenate compounds), treatment options can get complicated as dissolved selenium compounds in either the wet FGD slurry and/or wastewater stream cannot typically be removed by conventional chemical precipitation waste treatment technologies below current ELG (7.5 µg/L). Untreated selenium compounds are then present in the wastewater stream from the wet FGD thereby requiring special and expensive treatment equipment to remove same. Such processes can include, but are not limited to, various water purification processes known to those of skill in the art such as bio-reactors, one or more distillation processes (e.g., multi-stage flash distillation (MSF), multiple-effect distillation (MED/ME), vapor-compression (VC), etc.); one or more ion exchange processes, one or more membrane-based processes (e.g., electrodialysis reversal (EDR), reverse osmosis (RO), nanofiltration (NF), membrane distillation (MD), forward osmosis (FO), etc,).

Given the newly proposed effluent limit for selenium of 7.5 µg/L or ppb total selenium, it has now become desirable to minimize the amount of gas phase selenium entering a wet FGD.

Given the above, a need exists for a method that provides for any economical and environmentally suitable method and/or system to control, reduce, mitigate and/or eliminate one or more gas phase selenium compounds and/or one or more other RCRA metals, or RCRA metal compounds (regardless of whether such other RCRA metals or RCRA metal compounds are in the gas phase or some other phase) in one or more of a flue gas stream and/or from one or more pieces of emission control equipment. Additionally, or alternatively, a need exists for a method to control selenium emission and/or one or more other RCRA metal emissions in wastewater streams from one or more pieces of emission control equipment by preemptively controlling, reducing, mitigating and/or eliminating one or more gas phase selenium compounds in one or more of a flue gas stream and/or from one or more pieces of emission control equipment.

In another instance, even in jurisdictions outside of the scope of the US EPA (e.g., other countries and/or multinational jurisdictions such as Europe, China, etc.), a need exists, or will exists, to control the amount of one or more of arsenic (As), barium (Be), cadmium (Cd), chromium (Cr), lead (Pb), mercury (Hg), selenium (Se) and/or silver (Ag) (collectively referred to as the RCRA metals) that is/are emitted in one or more wastewater streams derived from various emission control technologies. Thus, it would be highly desirable to have a technology or method that permits and/or allows for the control of the levels of one or more of arsenic (As), barium (Ba), cadmium (Cd), chromium (Cr), lead (Pb), mercury (Hg), selenium (Se) and/or silver (Ag) (collectively referred to as the RCRA metals) that is/are emitted in one or more flue gas streams so as to prevent such one or more RCRA metals from subsequently entering one or more downstream wastewater streams generated during the application of various emission control technologies to various power generation technologies.

SUMMARY OF THE INVENTION

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for: (i) reducing the levels of one or more gas phase selenium compounds and/or one or more other RCRA metals, or RCRA metal compounds (regardless of whether such other RCRA metals or RCRA metal compounds are in the gas phase or some other phase); (ii) capturing, sequestering and/or controlling one or more gas phase selenium compound and/or one or more other RCRA metals, or RCRA metal compounds (regardless of whether such other RCRA metals or RCRA metal compounds are in the gas phase or some other phase) in a flue gas stream and/or in one or more pieces of emission control technology; and/or (iii) capturing, sequestering and/or controlling one or more gas phase selenium compound and/or one or more other RCRA metals, or RCRA metal compounds (regardless of whether such other RCRA metals or RCRA metal compounds are in the gas phase or some other phase) in a flue gas stream prior to desulfurization and/or in one or more pieces of emission control technology prior to one or more desulfurization units.

In one embodiment, the present invention relates to a method for reducing the amount and/or concentration of one or more gas phase selenium compounds, gas phase arsenic compounds and/or gas phase lead compounds in a combustion flue gas stream and/or in one or more pieces of emission control technology in communication with the flue gas stream, the method comprising the steps of: (I) supplying one or more sorbent compounds to one or more injection points in the combustion flue gas stream and/or one or more pieces of emission control technology combustion flue gas stream and/or in one or more pieces of emission control technology in communication with the flue gas stream; (II) injecting the one or more sorbent compounds into the combustion flue gas stream and/or the one or more pieces of emission control technology in communication with the flue gas stream via the one or more injection points; and (III) reducing the amount and/or concentration in the combustion flue gas stream of the one or more gas phase selenium compounds, one or more gas phase arsenic compounds and/or gas phase lead compounds by capturing, sequestering, binding and/or reacting the one or more gas phase selenium compounds, one or more gas phase arsenic compounds and/or one or more gas phase lead compounds on or with the one or more sorbent compounds.

In another embodiment, the present invention relates to a method for reducing the amount and/or concentration of one or more gas phase selenium compounds and/or one or more other RCRA metals, or RCRA metal compounds in a combustion flue gas stream and/or in one or more pieces of emission control technology in communication with the flue gas stream, regardless of whether such other RCRA metals or RCRA metal compounds are in the gas phase or some other phase, the method comprising the steps of: (A) supplying one or more sorbent compounds to one or more injection points in the combustion flue gas stream and/or one or more pieces of emission control technology combustion flue gas stream and/or in one or more pieces of emission control technology in communication with the flue gas stream; (B) injecting the one or more sorbent compounds into the combustion flue gas stream and/or one or more pieces of emission control technology combustion flue gas stream and/or in one or more pieces of emission control technology in communication with the flue gas stream via the one or more injection points; and (C) reducing the amount and/or concentration in the combustion flue gas stream of the one or more gas phase selenium compounds and/or one or mare other RCRA metals, or RCRA metal compounds, regardless of whether such other RCRA metals or RCRA metal compounds are in the gas phase or some other phase by capturing, sequestering, binding and/or reacting the one or more gas phase selenium compounds and/or one or more other RCRA metals, or RCRA metal compounds, on or with the one or more sorbent compounds.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

Figure 1:
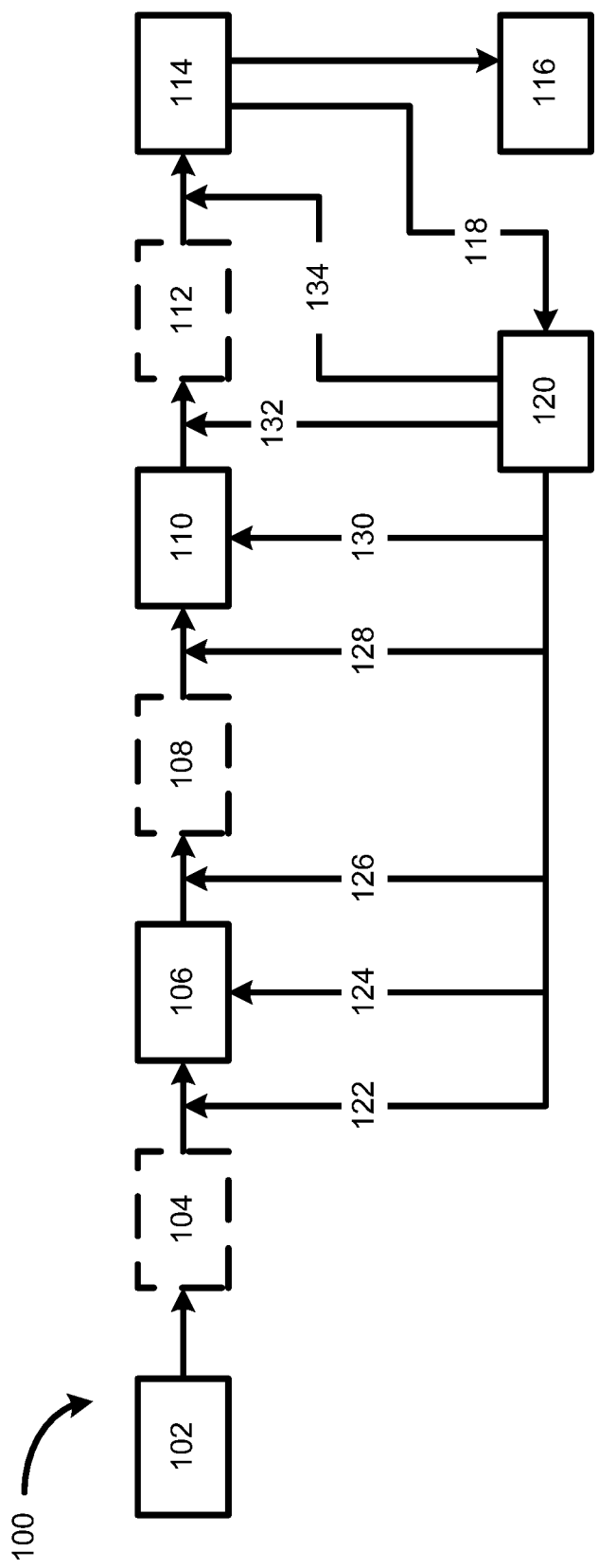
FIG. 1 is a schematic representation of a typical fossil fuel burning facility with various emission control devices connected thereto which includes a system for practicing the methods of the present invention.

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for: (i) reducing the levels of one or more gas phase selenium compounds and/or one or more other RCRA metals, or RCRA metal compounds (regardless of whether such other RCRA metals or RCRA metal compounds are in the gas phase or some other phase); (ii) capturing, sequestering and/or controlling one or more gas phase selenium compound and/or one or more other RCRA metals, or RCRA metal compounds (regardless of whether such other RCRA metals or RCRA metal compounds are in the gas phase or some other phase) in a flue gas stream and/or in one or more pieces of emission control technology; and/or (iii) capturing, sequestering and/or controlling one or more gas phase selenium compound and/or one or more other RCRA metals, or RCRA metal compounds (regardless of whether such other RCRA metals or RCRA metal compounds are in the gas phase or some other phase) in a flue gas stream prior to desulfurization and/or in one or more pieces of emission control technology prior to one or more desulfurization units.

Given the above, in one embodiment the present invention utilizes at least one sorbent to capture one or more gas phase selenium compounds and/or one or more other RCRA metals, or RCRA metal compounds (regardless of whether such other RCRA metals or RCRA metal compounds are in the gas phase or some other phase) in either the flue gas and/or one or more emission control systems or devices. In another embodiment, the present invention utilizes at least one particle-based sorbent to capture one or more gas phase selenium compounds and/or one or more other RCRA metals, or RCRA metal compounds (regardless of whether such other RCRA metals or RCRA metal compounds are in the gas phase or some other phase) in either the flue gas and/or one or more emission control systems or devices. In still another embodiment, the present invention utilizes at least one dry particle-based sorbent to capture one or more gas phase selenium compounds and/or one or more other RCRA metals, or RCRA metal compounds (regardless of whether such other RCRA metals or RCRA metal compounds are in the gas phase or some other phase) in either the flue gas and/or one or more emission control systems or devices.

In one embodiment, the sorbent of the present invention is gypsum (i.e., typically referred to as calcium sulfate dihydrate ($CaSO_4.2H_2O$), anhydrous calcium sulfate ($CaSO_4$), or even any other less hydrated form of gypsum (e.g., $CaSO_4.0.5H_2O$). Given the above, the amount of gypsum in the sorbent of the present invention can be anywhere in the range of about 10 weight percent to 100 weight percent, or from about 12.5 weight percent to about 99.5 weight percent, or from about 15 weight percent to about 97.5 weight percent, or from about 17.5 weight percent to about 95 weight percent, or from about 20 weight percent to about 92.5 weight percent, or from about 22.5 weight percent to about 90 weight percent, or from about 25 weight percent to about 87.5 weight percent, or from about 27.5 weight percent to about 85 weight percent, or from about 30 weight percent to about 82.5 weight percent, or from about 32.5 weight percent to about 80 weight percent, or from about 35 weight percent to about 77.5 weight percent, or from about 37.5 weight percent to about 75 weight percent, or from about 40 weight percent to about 72.5 weight percent, or from about 42.5 weight percent to about 70 weight percent, or from about 45 weight percent to about 67.5 weight percent, or from about 47.5 weight percent to about 65 weight percent, or from about 50 weight percent to about 62.5 weight percent, or from about 52.5 weight percent to about 60 weight percent, or even from about 55 weight percent to about 57.5 weight percent, with the remainder of the weight percent of the material injected with the sorbent being one or more of the additives listed above or any suitable inert material. Here, as well as elsewhere in the specification and claims, individual numerical values can be combined to form additional and/or non-disclosed ranges.

In one embodiment, the purity of the gypsum portion of the sorbent, or sorbent and one or more additives, can be anywhere from 40 weight percent to about 92.5 weight percent or more, or from about 42.5 weight percent to about 90 weight percent, or from about 45 weight percent to about 87.5 weight percent, or from about 47.5 weight percent to about 85 weight percent, or from about 50 weight percent to about 82.5 weight percent, or from about 52.5 weight percent to about 80 weight percent, or from about 55 weight percent to about 77.5 weight percent, or from about 55 weight percent to about 75 weight percent, or from about 57.5 weight percent to about 72.5 weight percent, or from about 60 weight percent to about 70 weight percent, or from about 62.5 weight percent to about 67.5 weight percent, or even about 65 weight percent. Here, as well as elsewhere in the specification and claims, individual numerical values can be combined to form additional and/or non-disclosed ranges.

Regarding the nature of the particle geometry and/or size of the sorbent utilized in conjunction with the present invention, the present invention is not bound to any one particle geometry and/or particle size. In one embodiment, the gypsum (i.e., typically referred to as calcium sulfate dihydrate ($CaSO_4.2H_2O$), anhydrous calcium sulfate ($CaSO_4$), or even any other less hydrated form of gypsum (e.g., $CaSO_4.0.5H_2O$) sorbent of the present invention can be of any particle shape with at least about 60 weight percent, at least about 65 weight percent, at least about 70 weight percent, at least about 75 weight percent, at least about 80 weight percent, at least about 85 weight percent, at least about 90 weight percent, at least about 95 weight percent, or even at least about 97.5 weight percent of the sorbent having a particle size in the range of about 5 µm to about 200 µm. Here, as well as elsewhere in the specification and claims, individual numerical values can be combined to form additional and/or non-disclosed ranges.

It should be noted that the present invention is not limited to any one injection rate of the sorbent. As will be understood by those of skill in the art, the rate at which the sorbent of the present invention are injected into the flue gas stream and/or into one or more emission control devices will depend on a number of factors which will differ from boiler to boiler. Such factors include, but are not limited to, boiler size, boiler type, fuel type, fuel chemical composition (e.g., the amount of selenium and/or other RCRA metals present in the fuel), boiler fuel usage, etc.

Regarding the types of sorbent that can be injected in connection with the present invention, such sorbents are typically either one or more wet or dry sorbents. By "wet" it is meant that the sorbent is/are supplied in the form of a solution, liquid-based suspension, liquid-based slurry, liquid-based emulsion, etc. By "dry" it is meant that the sorbent is/are supplied in the form of a powder, solid, or some other solid particle-based form. If supplied in "wet" form, the supply point for the sorbents and/or sorbent-additive combinations of the present invention can be such that the wet supplied material will end up drying in-situ prior to interacting, reacting, capturing and/or sequestering one or more gas phase selenium compounds and/or one or more other RCRA metals, or RCRA metal compounds (regardless of whether such other RCRA metals or RCRA metal compounds are in the gas phase or some other phase). In another instance, depending on various injection conditions such as high temperature injection versus low temperature injection, the sorbent of the present invention (e.g., gypsum) may not dry up completely and may retain some of its inherent moisture even at the higher temperature condition.

Given the above, the present invention will now be discussed in terms of an exemplary boiler/furnace system having connected thereto one or more emission control devices. In connection with the discussion of this exemplary non-limiting system various injection points for the sorbent material of the present invention will be discussed.

While not limited thereto, the present invention is equally applicable to a wide range of furnaces, or boilers, including, but not limited to, oxy-fuel combustion (i.e., oar-combustion) furnaces and/or boilers, variable temperature furnaces and/or boilers, standard air-fired furnaces and/or boilers, staged combustion air-fired furnaces and/or boilers, furnaces and/or boilers designed to permit re-burning (regardless of whether the re-burning fuel and the primary fuel are the same or different fuels) and/or furnaces and/or boilers with an economizer by-pass. Given that all of these types of furnaces and/or boilers are known to those of skill in the art a detailed description thereof is omitted for the sake of brevity. Given the wide range of different types of furnaces and/or boilers that the methods and/or apparatuses of the present invention have applicability to, the term "furnace" or the term "boiler" are utilized herein and within the claims to mean any type of fossil fuel-fired furnace or boiler, or fuel-fired boiler, including, but not limited, to all of the different types of furnaces and/or boilers listed above as well as any other types of furnaces and/or boilers that permit the burning of any type of fuel (e.g., biomass, waste matter, etc.) and/or fossil fuel that create combustion and/or flue gases that require one or more process to remove from such combustion and/or flue gases one or more compounds (e.g., acid gases, acid-based liquid wastes, $CO_2$, $NO_x$, $SO_x$, heavy metals, etc.) contained within the combustion and/or flue gas stream. Accordingly, from this point hereafter, the term furnace and/or boiler will encompass all of the types of furnaces and/or boilers listed above as well as those additionally known to those of skill in the art but not specifically listed herein unless otherwise specifically noted by reference to a specific type of furnace and/or boiler (e.g., a staged furnace and/or boiler).

Regarding the Figure contained herein, as will be apparent to those of skill in the art, only the major components necessary to convey the nature of the present invention are depicted. However, this does riot mean that the systems and/or methods of the present invention only utilize the components illustrated the Figure described below. Rather, numerous other components are necessary to achieve the desired operation of the systems and/or methods of the present invention. It is noted however, that these additional components are known to those of skill in the art and that the inclusion of such components would only result in a cluttered and/or unintelligible set of Figures. Some examples of components that are not illustrated in the attached Figure include, but are not limited to, one or more pumps (e.g., be they pumps to move liquid additives and/or reagents, dry additives and/or reagents, slurry- and/or suspension-based additives and/or reagents, liquid waste, etc.), one or more injection devices (e.g., be they injection devices for liquid additives and/or reagents, dry additives and/or reagents, slurry- and/or suspension-based additives and/or reagents, etc.), one or more fans (e.g., be they fans for achieving a desired gas flow rate in any one or more of the various ducts, conduits, or conveying passages necessary to connect one portion of the overall systems of the present invention to another portion thereof).

Furthermore, as will be apparent those of skill in the art upon reading and understanding the detailed description of the embodiments of the present invention, some of the choices for some of the "known" components for the systems of the present invention are not typically arranged in such a manner. For example, as will be discussed in more detail below the generalized particulate control devices of the present invention include wet ESPs which are not typically operated at positions upstream of a wet flue gas desulfurization (WFGD) unit. However, should any such currently non-typical arrangements and/or non-favored arrangements become so the future, the description of the embodiments of the present invention is not meant to be limiting and shall encompass all such arrangements regardless of whether now, or sometime later, viewed as desirable, favorable and/or technically achievable/acceptable. Another point to consider with regard to the various embodiments of the present invention is that in some applications the systems and/or methods of the present invention may not need, or require, all of the AQCS devices listed herein. For example, circulating fluidized bed boilers, stoker boilers and other combustion systems and/or processes known to those of skill in the art may not require the use of an air heater. In such instances the present invention is still applicable thereto with the caveat that the flue gases and/or combustion gases discussed below that are supplied to the one or more drying devices of the present invention can be supplied from any other suitable location via any suitable process including, but not limited to, a slipstream arrangement a bifurcated supply arrangement, etc.

Initially, it should be noted that FIG. 1 discloses a variety of components which are described herein with the caveat that components shown in dashed lines are optional and need not always be present. As such, in one embodiment any one or more, two or more, or even three or more of such dashed components of FIG. 1 are present. Alternatively, in another embodiment any combination of the various dashed components of any of FIG. 1 are present.

Turning to FIG. 1, FIG. 1 is an illustration of a system 100 according to one embodiment of the present invention. System 100 of FIG. 1 comprises a furnace/boiler 102 selected from any suitable furnace/boiler 102 including, but not limited to, any of the types of furnace/boilers discussed above. Furnace/boiler 102 is connected via any suitable conduit, duct or gas conveying passage to an air heater 106, represented by the horizontal arrows that connect furnace/boiler 102 to air heater 106. Regarding any of the conduits, ducts or des conveying passages in system 100, such structures are known to those of skill in the art and can, for example, be formed from any suitable material including but not limited to, metal, one or more metal alloys, or any combination thereof. In this instance furnace/boiler 102 is either an oxy-combustion device, utilizes a SNCR system, and/or does not require NO$_x$ control for whatever reason. Alternatively, where an SCR is desired such an SCR can be either: (i) a hot-side SCR 104 and be located between furnace/boiler 102 and air heater 106, and connected to each via a suitable set of conduits, ducts or gas conveying passages, which again represented by the horizontal arrows connecting components 102, 104 and 106; and (ii) a cold-side SCR 108 and be located between air heater 106 and particulate control device 110, and connected to each via a suitable set of conduits, ducts or gas conveying passages, which again represented by the horizontal arrows connecting components 106, 108 and 110. Regarding the particulate control devices useful in connection with the present invention as either a specifically called out particulate control device (e.g., device 110 and/or device 112) and/or any other particulate control device regardless of whether such particulate control device is specifically called out or generically mentioned (e.g., referred to as any one or more additional AQCS devices), such particulate control devices can be selected from any known device and/or system for removing particulate matter from a gas stream where such devices/systems include, but are not limited to, wet electrostatic precipitators (wet ESPs), dry electrostatic precipitators (dry ESPs), fabric filters (e.g., pulse jet fabric filters), etc. It should be noted that typically wet ESPs are not used upstream of WFGD units. As such, in one instance any particulate control devices of any of the embodiments of the present invention are not selected from any type of wet ESP should such one or more particulate control devices be located upstream of a WFGD unit. Again however, should such an arrangement either be, or at some later date become, desirable the embodiments of the present invention are meant to encompass any such non-traditional layouts/designs.

In one instance, particulate control device 110 is connected via a conduit, duct or gas conveying passage to a wet flue gas desulfurization (WFGD) unit 114, which is again represented by the horizontal arrow connecting components 110 to 114. In another instance, system 100 can further comprise a secondary particulate control device 112 located between particulate control device 110 (for the purposes of any embodiment with multiple particulate control devices, device 110 will be referred to as the primary particulate control device for clarity sake) and WFGD unit 114, and connected to each via a suitable set of conduits, ducts or gas conveying passages, which again represented by the horizontal arrows connecting components 110, 112 and 114. WFGD unit 114 is then connected to any one or more further AQCS devices (not shown) which could be located between WFGD unit 114 and stack 116 and/or WFGD unit 114 is connect to a stack 116 where the cleaned flue gases and/or combustion gases are transmitted to an environment external to system 100.

As is further illustrated by FIG. 1, WFGD unit 114 is designed to provide liquid waste and/or a liquid waste stream 118 to a gypsum-producing device 120. A detailed discussion of the exact nature of the gypsum-producing device 120 of system 100 is omitted for the sake of brevity as such devices are known to those of skill in the art. Once gypsum has been collected from liquid waste and/or a liquid waste stream 118 that is supplied to gypsum-producing device 120, gypsum is then supplied back upstream to one or more injection points 122 (upstream of, prior to, or at air heater inlet 106), 124 (inside air heater 106), 126 (downstream of or after air heater 106, or upstream of or prior to cold-side SCR 108, if present), 128 (downstream of or after a cold-side SCR 108, if present, or upstream of or prior to particulate control device 110), 130 (inside particulate control device 110), 132 (downstream of or after particulate control device 110) and/or 134 (downstream of or after secondary particulate control device 112, if present) so as to enable the gypsum sorbent (or any other sorbent according to the present invention), to interact, react, sequester and/or capture one or more gas phase selenium compounds and/or one or more other RCRA metals, or RCRA metal compounds (regardless of whether such other RCRA metals or RCRA metal compounds are in the gas phase or some other phase) in one or more of the flue gas stream and/or one or more pieces of emission control technology shown in FIG. 1. In another embodiment, should the amount of gypsum/sorbent generated from liquid waste stream 118 be insufficient, the gypsum needed for the methods of the present invention can be supplied independently from other external sources and injected at one or more of the injection points 122, 124, 126, 128, 130, 132 and/or 134 so as to enable the gypsum sorbent (or any other sorbent according to the present invention), to interact, react, sequester and/or capture one or more gas phase selenium compounds and/or one or more other RCRA metals, or RCRA metal compounds (regardless of whether such other RCRA metals or RCRA metal compounds are in the gas phase or some other phase) in one or more of the flue gas stream and/or one or more pieces of emission control technology shown in FIG. 1.

The injection of the gypsum sorbent (or any other sorbent according to the present invention), at one or more injection points illustrated in FIG. 1 permits the present invention to: (i) reduce the levels of one or more gas phase selenium compounds and/or one or more other RCRA metals, or RCRA metal compounds (regardless of whether such other RCRA metals or RCRA metal compounds are in the gas phase or some other phase); (ii) capture, sequester and/or control one or more gas phase selenium compound and/or one or more other RCRA metals, or RCRA metal compounds (regardless of whether such other RCRA metals or RCRA metal compounds are in the gas phase or some other phase) in a flue gas stream and/or in one or more pieces of emission control technology; and/or (iii) capture, sequester and/or control one or more gas phase selenium compound and/or one or more other RCRA metals, or RCRA metal compounds (regardless of whether such other RCRA metals or RCRA metal compounds are in the gas phase or some other phase) in a flue gas stream prior to desulfurization and/or in one or more pieces of emission control technology prior to one or more desulfurization units. This in turn results in a reduction in the amount of one or more selenium compounds and/or one or more other RCRA metals, or RCRA metal compounds (regardless of whether such other RCRA metals or RCRA metal compounds are in the gas phase or some other phase) that end up in any one or more wastewater streams that come off of system 100 after any one or more of the gypsum sorbent (or any other sorbent according to the present invention), or a sorbent-additive combination injection points.

Given the above, the present invention is advantageous in that in one instance it permits an increase in the amount of one or more gas phase selenium compounds and/or one or more other RCRA metals, or RCRA metal compounds (regardless of whether such other RCRA metals or RCRA metal compounds are in the gas phase or some other phase) that are captured on one or more sorbent particle surfaces upstream of a wet FGD, and thus has the potential to not only lower the selenium and/or one or more other RCRA metal concentrations in a wet FGD's absorber slurry filtrate but also to minimize gas phase selenium and one or more RCRA metals exiting the stack. While not limiting in any manner, in one embodiment, the sorbent and/or sorbent-additive composition of the present invention is injected at point 122 and/or 124. That is, at least one of the exits of particulate control devices 110 and/or 112. While non-limiting in nature, the temperature at such a point is typically in the range of about 121.1° C. (or about 250° F.) to about 204.4° C. (or about 400° F.), or in the range of about 135° C. (or about 275° F.) to about 190.6° C. (or about 375° F.), or in the range of about 149° C. (or about 300° F.) to about 176.7° C. (or about 350° F.), or even in the range of about 157.2° C. (or about 315° F.) to about 165.6° C. (or about 330° F.). Here, as well as elsewhere in the specification and claims, individual numerical values can be combined to form additional and/or non-disclosed ranges.

In another embodiment the present invention involves the injection of one or more of the sorbents disclosed herein at one or more locations where the temperature is less than about 482.2° C. (or about 900° F.), is less than about 468.3° C. (or about 875° F.), is less than about 454.4° C. (or about 850° F.), is less than about 440.6° C. (or about 825° F.), is less than about 426.7° C. (or about 800° F.), is less than about 412.8° C. (or about 775° F.), is less than about 398.9° C. (or about 750° F.), is less than about 385° C. (or about 725° F.), is less than about 371.1° C. (or about 700° F.), is less than about 357.2° C. (or about 675° F.), is less than about 343.3° C. (or about 650° F.), is less than about 329.4° C. (or about 625° F.), is less than about 315.6° C. (or about 600° F.), is less than about 301.7° C. (or about 575° F.), is less than about 287.8° C. (or about 550° F.), is less than about 273.9° C. (or about 525° F.), is less than about 260° C. (or about 500° F.), is less than about 246.1° C. (or about 475° F.), is less than about 232.2° C. (or about 450° F.), is less than about 213.3° C. (or about 425° F.), is even less than 204.4° C. (or about 400° F.), is less than about 190.6° C. (or about 375° F.), is less than about 176.7° C. (or about 350° F.), is less than about 162.8° C. (or about 325° F.), is less than about 148.9° C. (or about 300° F.), or is even less than about 135° C. (or about 275° F.). Here, as well as elsewhere in the specification and claims, individual numerical values can be combined to form additional and/or non-disclosed ranges.

Another non-limiting advantage of the present invention is that it is more economical then other processes in reducing, capturing, sequestering and/or eliminating one or more gas phase selenium compounds and/or one or more other RCRA metals, or RCRA metal compounds (regardless of whether such other RCRA metals or RCRA metal compounds are in the gas phase or some other phase). Given this, in one embodiment the present invention permits a reduction, capture, sequester and/or elimination of from about 30 weight percent to about 95 weight percent or more of any one or more gas phase selenium compounds and/or one or more other RCRA metals, or RCRA metal compounds (regardless of whether such other RCRA metals or RCRA metal compounds are in the gas phase or some other phase) present in the flue gas stream and/or one or more pieces of emission control technology. In another embodiment, the present invention permits a reduction, capture, sequester and/or elimination of from about 32.5 weight percent to about 92.5 weight percent, or from about 35 weight percent to about 90 weight percent, or from about 37.5 weight percent to about 87.5 weight percent, or from about 40 weight percent to about 85 weight percent, or from about 42.5 weight percent to about 82.5 weight percent, or from about 45 weight percent to about 80 weight percent, or from about 47.5 weight percent to about 77.5 weight percent, or from about 50 weight percent to about 75 weight percent, or from about 52.5 weight percent to about 72.5 weight percent, or from about 55 weight percent to about 70 weight percent, or from about 57.5 weight percent to about 67.5 weight percent, or from about 60 weight percent to about 65 weight percent, or even about 62.5 weight percent of any one or more gas phase selenium compounds and/or one or more other RCRA metals, or RCRA metal compounds (regardless of whether such other RCRA metals or RCRA metal compounds are in the gas phase or some other phase) present in the flue gas stream and/or one or more pieces of emission control technology. Here, as well as elsewhere in the specification and claims, individual numerical values can be combined to form additional and/or non-disclosed ranges.

EXAMPLES

It should be noted that the present invention is not limited to the following examples and that the numerical values disclosed in the examples are related to the boiler used to conduct the testing detailed below. As would be apparent to those of skill in the art, the injection rates and other numerical parameters and values will vary or change depending on one or more of boiler size, boiler type, fuel type, fuel usage rate, etc. The wide range of combustion parameters associated with combusting various fossil fuels in one or more fossil fuel burning power plants (e.g., a coal-fired power plant)

Figure 2:
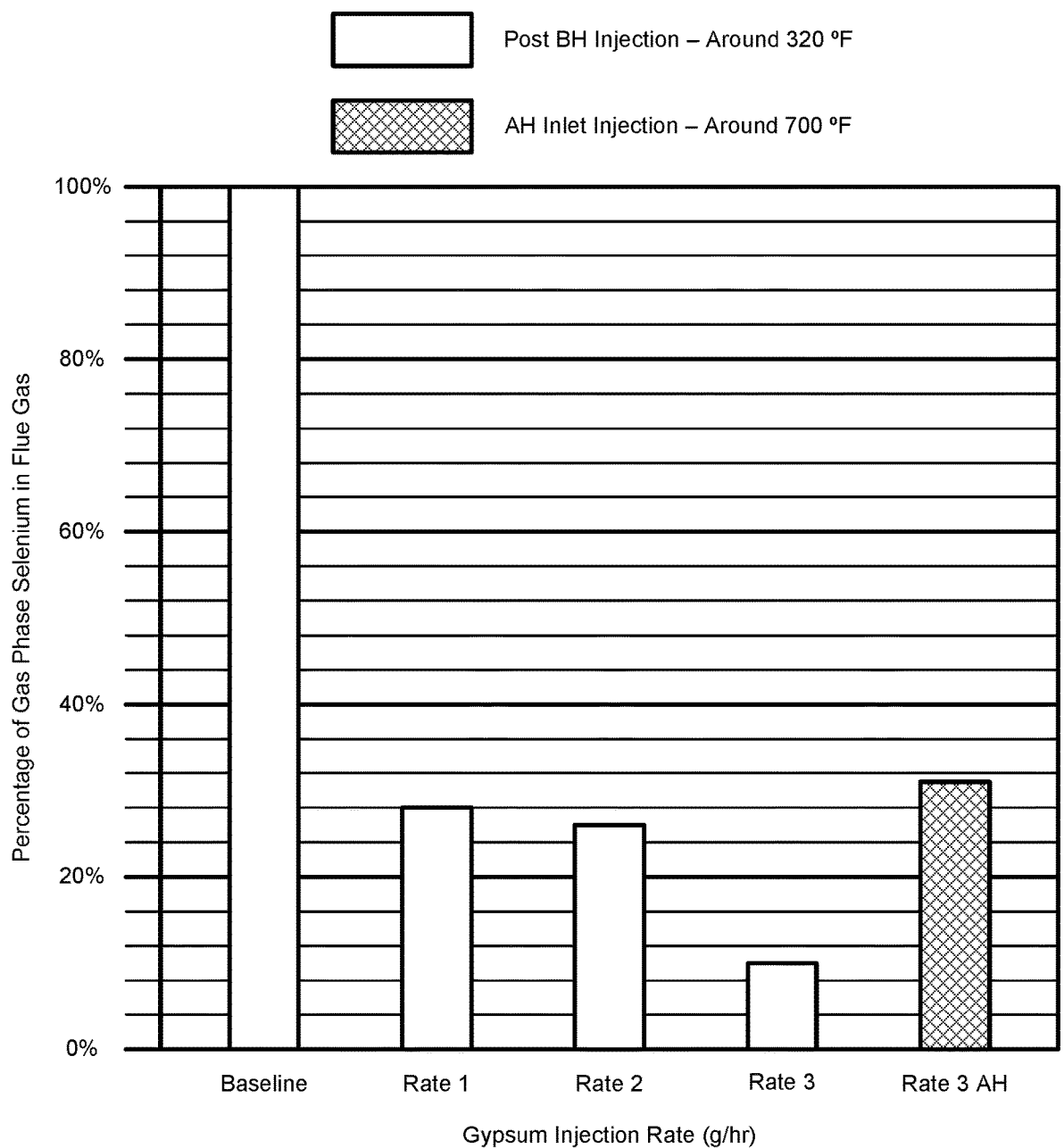
FIG. 2 is a graph illustrating selenium concentrations in a flue gas stream using different injection rates for a sorbent in accordance with the present invention at two different injection points (injection post-baghouse and injection at the air heater inlet)
Figure 3:
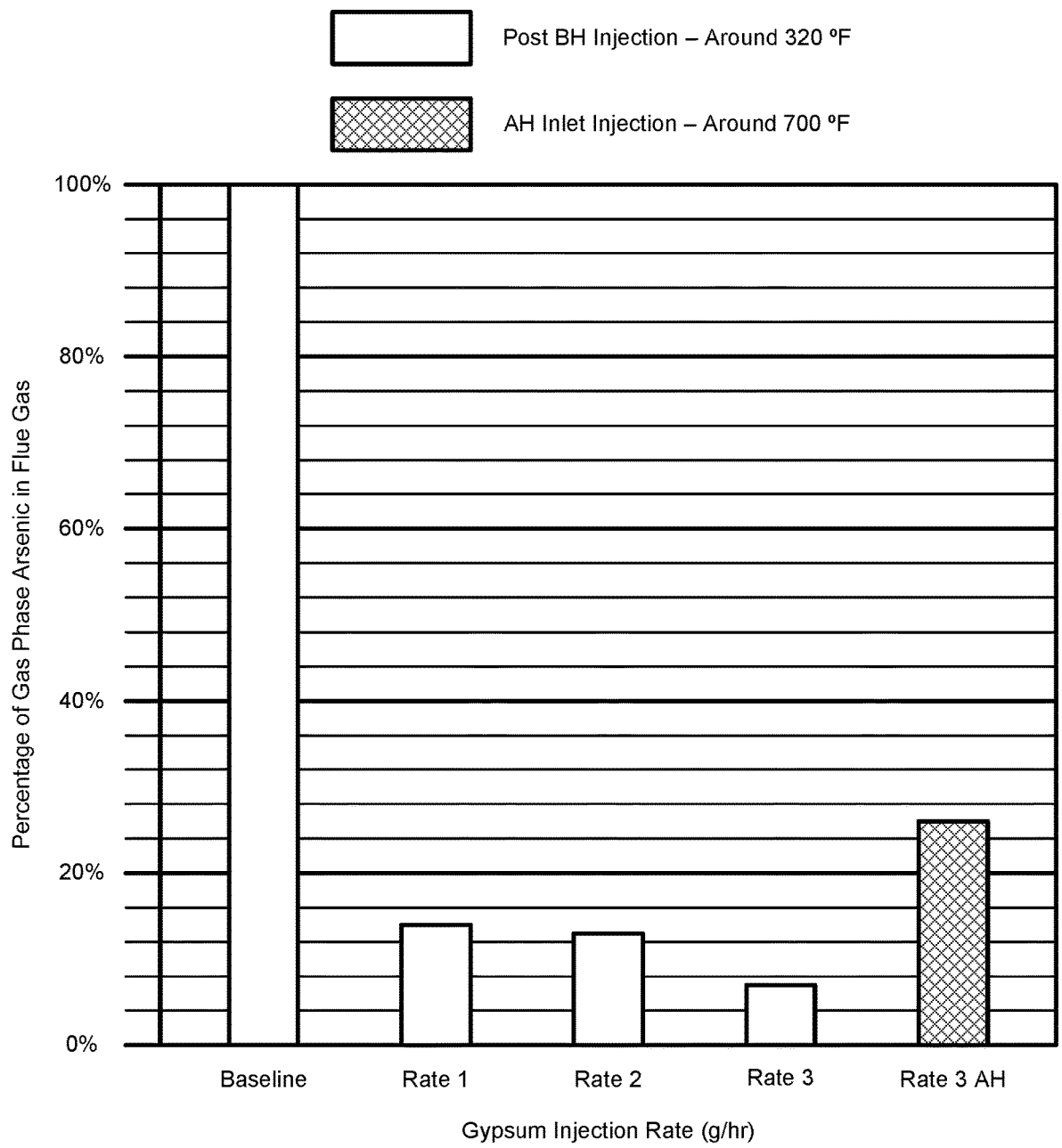
FIG. 3 is a graph illustrating arsenic concentrations in a flue gas stream using different injection rates for a sorbent in accordance with the present invention at two different injection points (injection post-baghouse and injection at the air heater inlet)
Figure 4:
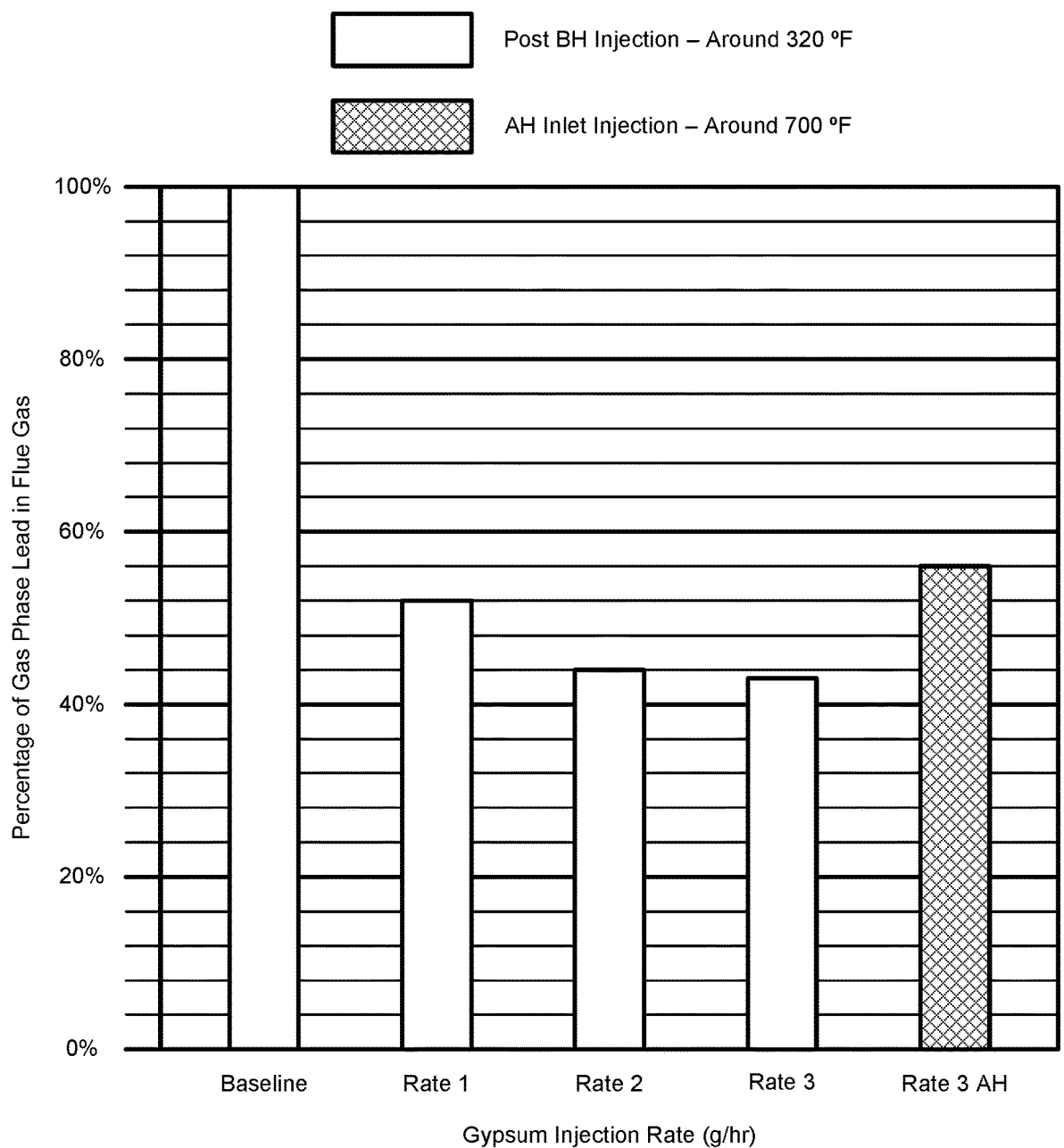
FIG. 4 is a graph illustrating lead concentrations in a flue gas stream using different injection rates for a sorbent in accordance with the present invention at two different injection points (injection post-baghouse and injection at the air heater inlet).

The testing utilized to generate the graphs of FIGS. 2 through 4 is produced during testing at a simulated 700 MW boiler burning eastern bituminous coal. Specifically, the combustion system of the testing boiler unit is a down-fired combustor equipped with a refractory lined furnace section, a convective pass section, followed by a baghouse (BH) for particulate control and a wet flue gas desulfurization (WFGD) unit for $SO_x$ control. This system is designed and built to closely simulate time—temperature history in a 700 MW commercial boiler. As such, the following test conditions are utilized: 20 percent excess air and approximately 2268 grams/hour (or about 5 pounds/hour) of fuel feed. Gas analyzers ($O_2$, $CO/CO_2$, $SO_x$ and $NO_x$) are used to monitor and record flue gas concentration at both convection pass exit and at the stack. The following sorbent injection and sampling conditions are utilized: three injection rates labeled as Rate 1, Rate 2 and Rate 3 are utilized. The injection rates are about 50 grams/hour (Rate 1), about 100 grams/hour (Rate 2) and about 300 grams/hour (both Rate 3 and Rate 3 AH) and in these examples Rate 1, Rate 2 and Rate 3 are injected after particulate control device (PCD) (which as is noted above is a baghouse in the present examples) where the flue gas temperature is in this example anywhere between about 149° C. (or about 300° F.) and about 162.8° C.(or about 325° F.). It should be noted that in commercial units the temperature in the baghouse can be in the range of about 121.1° C. (or about 250° F.) to about 204.4° C. (or about 400° F.), or any of the other nested ranges noted above in relation to this broader range. Samples are collected around a flue gas temperature of about 82.2° C. (or about 180° F.) so as to closely simulate WFGD entry conditions and sample lines (including particulate filter casing) are maintained hot to prevent moisture condensation.

An additional test is conducted where sorbent is injected at about 371.1° C. (or about 700° F.) in order to simulate injection into a flue gas at an air heater inlet temperature conditions common to most commercial boilers and sampled prior to inlet of the simulated flue gas entering the baghouse where the temperature is in this example about 165.6° C. (or about 330° F.). It should be noted that in commercial units the temperature in the baghouse can be in the range of about 121.1° C. (or about 250° F.) to about 204.4° C. (or about 400° F.), or any of the other nested ranges noted above in relation to this broader range. The sorbent injection rate for this test is the same as Rate 3 and is about 300 grams/hour. Flue gas sampling is conducted using EPA approved Method 29 to collect both particulate and flue gas samples. Collected samples (both particulate and gas) are recovered per Method 29 specifications as well. Analysis of metals: Recovered particulate and gas samples are later analyzed for metals of interest (Se, As, Pb, Cr and Sb) using an ICP-MS. An approved EPA method is followed in preparing samples and during analysis and approved measures are taken to ensure reported data are within the established QA/QC acceptance criteria. Suitable EPA methods include: (i) for sample collection—Method 29—Determination of Metals from Stationary Sources; (ii) for liquid sample preparation for analysis—Method 200.8—Determination of Trace Elements in Waters and Wastes by Inductively Coupled Plasma-Mass Spectrometry; (iii) for solid sample preparation for analysis—SW-846 Test Method 3052B—Microwave Assisted Acid Digestion of Siliceous and Organically Based Matrices; and (iv) for elemental analysis, SW-846 Test Method 6020A—Inductively Coupled Plasma-Mass Spectrometry. The residence times between the injection of the sorbent and sample collection for all three of the tests detailed above and for the air heater test detailed above are one (1) second or less. It should be noted that the present invention is not limited thereto and that those of skill in the art would recognize that residence times are a function of the design of various air quality control system (AQCS) and thus the test conditions for the method of the present invention utilize a short residence time to illustrate that the present invention is effective even in situations where the residence time in any give AQCS device is short.

Results: Raw analysis data for both particulate and gas phase species are converted to normalized units (as weight of element per volume of dry flue gas sampled) for standardized comparisons. Additionally, the data plots presented in FIGS. 2 through 4 show concentration of species present only in the flue gas for the various test conditions and not in the particulate phase. Presenting data for the values of various elements in the flue gas phase makes it easier for comparison to the baseline data presented in FIGS. 2 through 4 and thus determine the sorbent effect on the gas phase species and/or elements and thus permits one to determine to a high degree of relevancy the concentration of various captured metals in particulate phase.

Given the above, a discussion of the data presented in FIGS. 2 through 4 will now be undertaken. Turning to FIG. 2, FIG. 2 is a graph illustrating the Baseline amount of selenium in the gas phase in the exemplary flue gas generated in accordance with the above conditions. As can be seen from FIG. 2, the Baseline amount is normalized to be 100 percent so that a comparison based percentage of reduction of gas phase selenium due to the injection of a sorbent in accordance with the present invention can be undertaken. The Baseline amount of gas phase selenium as used herein gas phase selenium is to be broadly construed to cover any gas phase selenium compound, but is most likely either the elemental state $Se^0$ and/or the oxide form $SeO_2$. In another instance some of the gas phase selenium could be ionic compounds containing various selenium ions therein. Such selenium ions could include, but are not limited to, $SeO_3^{2-}$, $SeO_4^{2-}$, $Se^{4+}$, $Se^{6+}$, etc. In still another instance the selenium in the flue gas stream could be a combination of any two or more, three or more, four or more, or any five or more of the compounds, ions, and/or elemental selenium mentioned above. The Rate 1 Rate 2, Rate 3 and Rate 3 AH (for injection of sorbent at the air heater per the conditions detailed above) amounts of gas phase selenium are then determined and are compared to the numerical value of the Baseline that has been normalized to 100 percent. Given this, Rate 1 sorbent injection conditions yield a gas phase selenium concentration of 28 percent as compared to the Baseline amount. Thus, the method of the present invention using sorbent injection post baghouse at Rate 1 yields a 72 percent reduction in gas phase selenium from the Baseline amount. Rate 2 sorbent injection conditions yield a gas phase selenium concentration of 26 percent as compared to the Baseline amount Thus, the method of the present invention using sorbent injection post baghouse at Rate 2 yields a 74 percent reduction gas phase selenium from the Baseline amount. Rate 3 sorbent injection conditions yield a gas phase selenium concentration of 10 percent as compared to the Baseline amount. Thus, the method of the present invention using sorbent injection post baghouse at Rate 1 yields a 90 percent reduction in gas phase selenium from the Baseline amount. Rate 3 AH sorbent injection conditions yield a gas phase selenium concentration of 31 percent as compared to the Baseline amount. Thus, the method of the present invention using sorbent injection at the air heater inlet at Rate 3 yields a 69 percent reduction in gas phase selenium from the Baseline amount.

Turning to FIG. 3, FIG. 3 is a graph illustrating the Baseline amount of arsenic in the gas phase in the exemplary flue gas generated in accordance with the above conditions. As can be seen from FIG. 3, the Baseline amount is normalized to be 100 percent so that a comparison based percentage of reduction of gas phase arsenic due to the injection of a sorbent in accordance with the present invention can be undertaken. The Baseline amount of gas phase arsenic as used herein gas phase arsenic is to be broadly construed to cover any gas phase arsenic compound, but is most likely $As_2O_3$ and/or $As_2O_5$ or reacts with calcium to form $Ca_3(AsO_4)_2$. In another instance some of the gas phase arsenic could be ionic compounds containing various arsenic ions therein. Such arsenic ions could include, but are not limited to, $AsO_3^{3-}$, $ArO_4^{3-}$, $As_2O_5^{4-}$, $As_3O_7^{5-}$, $As_4O_9^{6-}$, $As^{3+}$, $As^{5+}$, etc. In still another instance the arsenic in the flue gas stream could be a combination of any two or more, three or more, four or more, or any five or more of the compounds and/or ions mentioned above. The Rate 1, Rate 2, Rate 3 and Rate 3 AH (for injection of sorbent at the air heater per the conditions detailed above) amounts of gas phase arsenic are then determined and are compared to the numerical value of the Baseline that has been normalized to 100 percent. Given this, Rate 1 sorbent injection conditions yield a gas phase arsenic concentration of 14 percent as compared to the Baseline amount. Thus, the method of the present invention using sorbent injection post baghouse at Rate 1 yields an 86 percent reduction in gas phase arsenic from the Baseline amount. Rate 2 sorbent injection conditions yield a gas phase arsenic concentration of 13 percent as compared to the Baseline amount. Thus, the method of the present invention using sorbent injection post baghouse at Rate 2 yields an 87 percent reduction in gas phase arsenic from the Baseline amount. Rate 3 sorbent injection conditions yield a gas phase arsenic concentration of 7 percent as compared to the Baseline amount. Thus, the method of the present invention using sorbent injection post baghouse at Rate 1 yields a 93 percent reduction in gas phase arsenic from the Baseline amount. Rate 3 AH sorbent injection conditions yield a gas phase arsenic concentration of 26 percent as compared to the Baseline amount. Thus, the method of the present invention using sorbent injection at the air heater inlet at Rate 3 yields a 74 percent reduction in gas phase arsenic from the Baseline amount.

Turning to FIG. 4, FIG. 4 is a graph illustrating the Baseline amount of lead in the gas phase in the exemplary flue gas generated in accordance with the above conditions. As can be seen from FIG. 4, the Baseline amount is normalized to be 100 percent so that a comparison based percentage of reduction of gas phase lead due to the injection of a sorbent in accordance with the present invention can be undertaken. The Baseline amount of gas phase lead as used herein gas phase lead is to be broadly construed to cover any gas phase lead compound, but is most likely either PbO and/or $PbO_2$. In another instance some of the gas phase lead could be ionic compounds containing various lead ions therein. Such lead ions could include, but are not limited to, $Pb^{2+}$, $Pb^{4+}$, etc. In still another instance the lead in the flue gas stream could be a combination of any two or more, three or more, four or more, or any five or more of the compounds and/or ions mentioned above. The Rate 1, Rate 2, Rate 3 and Rate 3 AH (for injection of sorbent at the air heater per the conditions detailed above) amounts of gas phase lead are then determined and are compared to the numerical value of the Baseline that has been normalized to 100 percent. Given this, Rate 1 sorbent injection conditions yield a gas phase lead concentration of 52 percent as compared to the Baseline amount. Thus, the method of the present invention using sorbent injection post baghouse at Rate 1 yields a 48 percent reduction in gas phase lead from the Baseline amount. Rate 2 sorbent injection conditions yield a gas phase lead concentration of 44 percent as compared to the Baseline amount. Thus, the method of the present invention using sorbent injection post baghouse at Rate 2 yields a 56 percent reduction in gas phase lead from the Baseline amount. Rate 3 sorbent injection conditions yield a gas phase lead concentration of 43 percent as compared to the Baseline amount. Thus, the method of the present invention using sorbent injection post baghouse at Rate 1 yields a 57 percent reduction in gas phase lead from the Baseline amount from the Baseline amount. Rate 3 AH sorbent injection conditions yield a gas phase lead concentration of 56 percent as compared to the Baseline amount. Thus, the method of the present invention using sorbent injection at the air heater inlet at Rate 3 yields a 44 percent reduction in gas phase lead from the Baseline amount.

Only the gas phase results are presented above so that the method of the present invention can be judged based on its gas phase results rather than a review of the amounts in the particulate form which could be skewed as the particulate amounts of the selenium, arsenic and/or lead compounds could include amounts of these elements or their compounds that are always in the particulate phase throughout the combustion process as at least one or more particulate compounds of selenium, arsenic and/or lead are known to be generated by various fossil fuel combustion processes.

Given the above, the present invention is not limited to any one injection rate even though a number of exemplary rates are disclosed above. As would be apparent to those of skill in the art, at least one or more of the following combustion conditions, design parameters and/or other factors can affect the amount of the one or more sorbents injected in conjunction with the present invention: combustion fuel type, fuel supply rate, boiler size, boiler type, combustion process (e.g., oxy-combustion, staged combustion, etc.), fuel type, coal type, air heater size, air heater residence time, type and/or size of any one or more particulate control, or collection, devices, particulate control device residence time, type or size of $SO_x$ control device, size of WFGD device. etc. Nor is the present invention limited to any one residence time in any one or more AQCS devices downstream of any one or more sorbent injection points (regardless of whether actual sorbent injection takes place in such a device or upstream of such a device), In light of the above, the present invention relates to the use of one or more of the sorbents discussed above to capture, sequester, bind and/or react one or more gas phase selenium compounds, one or more gas phase arsenic compounds and/or one or more gas phase lead compounds, or any two or more thereof with one or more sorbent compounds discussed above. While not wishing to be bound to any one theory it is believed that the one or more sorbents of the present invention present a high surface area sorbent and permit physisorption (also called physical adsorption—which is the process in which atoms, ions or molecules of a substance adhere to a surface of an adsorbent (herein referred to as a sorbent)) of one or more of the selenium compounds described herein, of one or more of the arsenic compounds described herein and/or of one or more of the lead compounds described herein, or even any combination of two or more thereof, three or more thereof, four or more thereof with such one or more sorbents. Some of the flue gas parameters, characteristics and/or properties that potentially have an impact on physisorption can include at least one or more of $SO_2$ flue gas stream concentration, $O_2$ flue gas stream concentration, $H_2O$ vapor flue gas concentration, etc.

Thus, while not wishing to be bound to any one theory and/or mode of operation, the methods of the present invention are believed to rely on physisorption of one or more gas phase selenium compounds, one or more gas phase arsenic compounds and/or one or more gas phase lead compounds, or any two or more thereof with one or more of the sorbents disclosed herein. Given this, on one embodiment the surface of the one or more sorbent areas of the present invention are not critical so long as the sorbent, or sorbents, be used in connection with the present invention have a high enough surface area to permit at least a desired amount, or level, of physisorption. In one non-limiting embodiment, the surface area of the one or more sorbents utilized in the methods of the present invention are in the range of about 1 meter$^2$/gram to about 50 meters$^2$/gram, or from about 2 meters$^2$/gram to about 47.5 meters$^2$/gram, or from about 2.5 meters$^2$/gram to about 45 meters$^2$/gram, or from about 3 meters$^2$/gram to about 42.5 meters$^2$/gram, or from about 4 meters$^2$/gram to about 40 meters$^2$/gram, or from about 5 meters$^2$/gram to about 37.5 meters$^2$/gram, or from about 6 meters$^2$/gram to about 35 meters$^2$/gram, or from about 7 meters$^2$/gram to about 32.5 meters$^2$/gram, or from about 8 meters$^2$/gram to about 30 meters$^2$/gram, or from about 9 meters$^2$/gram to about 27.5 meters$^2$/gram, or from about 10 meters$^2$/gram to about 25 meters$^2$/gram, or from about 11 meters$^2$/gram to about 22.5 meters$^2$/gram, or from about 12 meters$^2$/gram to about 20 meters$^2$/gram, or from about 13 meters$^2$/gram to about 19 meters$^2$/gram, or from about 14 meters$^2$/gram to about 18 meters$^2$/gram, or from about 15 meters$^2$/gram to about 17 meters$^2$/gram, or even about 16 meters$^2$/gram, Here, as well as elsewhere in the specification and claims, individual numerical values can be combined to form additional and/or non-disclosed ranges. Here, as well as elsewhere in the specification and claims, individual numerical values can be combined to form additional and/or non-disclosed ranges.

Additionally, due to the fact that it is believed that the methods of the present invention achieve their capture, sequester, binding and/or reaction of one or more gas phase selenium compounds, one or more gas phase arsenic compounds and/or one or more gas phase lead compounds, or any two or more thereof with (or on) the one or more sorbent compounds of the present invention due to physisorption, the speciation of any of the one or more gas phase compounds and/or ions of the various selenium, arsenic and/or lead compounds and/or ions discussed above are not believed to be as important to the functioning of the methods of the present invention as are the surface area of the one or more sorbent compounds and/or the pore size of the pores contained in/on the one or more sorbents discussed herein. As would be recognized by those of skill in the art, the pore size of the pores in the one or more sorbents discussed herein are not critical so long as the sorbents utilized in the methods discussed herein have pores sizes that yield the necessary range of surface areas disclosed above.

It should be noted that some of the gas phase compounds and/or ions discussed above might undergo conversion from one speciation state, or ionic state, to another due to the oxidative-reductive environment that exists in a flue gas stream in various AQCS devices. Thus, in another instance the present invention may also rely on chemisorption (also called chemical adsorption—which is the process in which atoms, ions or molecules of a substance are adsorbed by an adsorbent (herein referred to as a sorbent) due to one or more chemical bonds formed between the compound adsorbed and the adsorbent) of one or more of the selenium compounds described herein, of one or more of the arsenic compounds described herein and/or of one or more of the lead compounds described herein, or even any combination of two or more thereof, three or more thereof, four or more thereof with such one or more sorbents. Some of the flue gas parameters, characteristics and/or properties that potentially have an impact on chemisorption can include flue gas temperature, etc. in still another instance, the present invention could rely on any combination of physisorption and chemisorption.

Accordingly, in one embodiment the present invention is directed to a method that utilizes at least one injection of one or more of the sorbent compounds discussed above at at least one of injection points 122, 124, 126, 128, 130, 132 and/or 134. In another embodiment, the sorbent utilized is gypsum. In still another embodiment, a staged injection is utilized where at least two injections of sorbent are utilized with the first injection of sorbent occurring prior to or in air heater 106 and the second injection of sorbent occurring prior to, in or after particulate control device 110 (e.g., a baghouse or some version of an ESP).

Due to various advantages realized by the methods of the present invention, the methods of the present invention permit an operator to achieve the control, capture, sequester, binding and/or reaction of one or more gas phase selenium compounds, one or more gas phase arsenic compounds and/or one or more gas phase lead compounds, or any two or more thereof with (or on) the one or more sorbent compounds discussed above in order to achieve a desired reduction in one or more of selenium, arsenic and/or lead emitted in a wastewater stream, where such a wastewater stream has been generated from an AQCS train that has utilizes a method in accordance with the present invention. While not being bound to any one level or reduction in one or more of the selenium, arsenic and/or lead levels contained in a wastewater stream emitted after treatment with a method in accordance with the present invention, it is believed that the present invention could enable an operator to meet various Effluent Limit Guidelines (ELGs) or values set by the EPA, the EU or any other country's governmental body or regulating agency. For example, in the US various ELGs have been set for selenium, arsenic and/or lead in wastewater streams emitted and/or generated by various AQCS processes in connection with steam electric power generation. It should be noted that even if the present invention does not alone achieve the necessary ELG level, the present invention can effectively capture, sequester and/or bind enough of one or more of selenium, arsenic and/or lead to vast reduce the time and complexity of any additional wastewater treatment needed to meet such ELG levels. This same reasoning applies to other emission standards regardless of whether or not they are ELGs from the US EPA.

While not wishing to be bound to any one theory, it is believed that the present invention is advantageous in that the injection of at least one sorbent material discussed above downstream of particulate control device 110 and/or, if present and so desired, downstream of particulate control device 112 at points 122 and/or 124 yields a more effective manner in which to control, capture, mitigate and/or sequester at least one of selenium and/or one or more other RCRA metals (regardless of whether such RCRA metals or RCRA metal compounds are in the gas phase or some other phase). The present invention's use of injection points downstream of at least particulate control device 110 and/or downstream of particulate device 112 is believed to prevent/mitigate the injected sorbent (e.g., gypsum) from becoming diluted by any fly ash in the flue gas stream (i.e., preventing a fly ash dilution effect). This is because at least particulate control device 110 removes a suitable amount of particulate material from the flue gas stream prior to the injection of the sorbent material of the present invention. Thus, the sorbent injection rates necessary for the present invention are generally much lower than the ash flow rates in the flue gas. This in turn results in the desired contact between one or more of selenium and/or one or more other RCRA metals present in the flue gas stream (regardless of whether such RCRA metals or RCRA metal compounds are in the gas phase or some other phase) with the sorbent particles so that the desired adsorption/diffusion process takes place. Again, while not wishing to be bound to any one theory, it is believed that injection of a sorbent, or sorbents, in accordance with the present invention yields an effective method for controlling, capturing, mitigating and/or sequestering one or more of selenium and/or other RCRA metals in a flue gas stream (regardless of whether such RCRA metals or RCRA metal compounds are in the gas phase or some other phase).

While not wishing to be bound to any one theory, is believed that the present invention is advantageous in that the injection of at least one sorbent material at one or more of injection points 122 (upstream of, prior to, or at air heater inlet 106), 124 (inside air heater 106), 126 (downstream of or after air heater 106, or upstream of or prior to cold-side SCR 108. If present), 128 (downstream of or after a cold-side SCR 108, if present, or upstream of or prior to particulate control device 110), 130 (inside particulate control device 110), 132 (downstream of or after particulate control device 110) and/or 134 (downstream of or after secondary particulate control device 112, if present) yields a more effective manner in which to control, capture, mitigate and/or sequester at least one of selenium and/or one or more other RCRA metals (regardless of whether such RCRA metals or RCRA metal compounds are in the gas phase or some other phase). Again, while not wishing to be bound to any one theory, it is believed that injection of a sorbent, or sorbents, in accordance with the present invention yields an effective method for controlling, capturing, mitigating and/or sequestering one or more of selenium and/or other RCRA metals in a flue gas stream (regardless of whether such RCRA metals or RCRA metal compounds are the gas phase or some other phase).

In another instance, the present invention is advantageous in that the present invention utilizes an existing site by-product stream (e.g., gypsum as a sorbent) as the adsorbent material for capture of gas phase selenium as well as gas phase arsenic and lead compounds. Since gypsum is a by-product material this makes the use of such a gypsum by-product as an adsorbent, or sorbent, material for the present invention relatively inexpensive and permits a user of the present invention to realize a cost savings. Also, there is a potentially large cost savings when capturing gas phase selenium, arsenic and lead on solid gypsum particles as opposed to permitting an untreated flue gas stream from entering an absorber recirculation tank (ART) in, for example, a wet flue gas desulfurization (WFGD) unit and then entering a waste water stream emitted from the ART. The gas/solid mode of removal for selenium of the present invention is less expensive than having to treat the waste water stream from a WFGD.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A method for reducing the amount and/or concentration of one or more gas phase selenium compounds, one or more gas phase arsenic compounds and/or one or more gas phase lead compounds in a combustion flue gas stream and/or in one or more pieces of emission control technology in communication with the flue gas stream, the method comprising the steps of:

(I) supplying one or more gypsum sorbent compounds to one or more injection points in the combustion flue gas stream and/or one or more pieces of emission control technology combustion flue gas stream and/or in one or more pieces of emission control technology in communication with the flue gas stream;

(II) injecting the one or more gypsum sorbent compounds into the combustion flue gas stream and/or the one or more pieces of emission control technology in communication with the flue gas stream via the one or more injection points; and (III) reducing the amount and/or concentration in the combustion flue gas stream of the one or more gas phase selenium compounds, the one or more gas phase arsenic compounds and/or the one or more gas phase lead compounds by capturing, sequestering, binding and/or reacting the one or more gas phase selenium compounds, the one or more gas phase arsenic compounds and/or tine one or more gas phase lead compounds on or with the one or more gypsum sorbent compounds, wherein the one or more pieces of emission control technology in communication with the flue gas stream comprise at least one particulate control device or at least one air heater and wherein Step (III) is achieved by supplying and injecting the one or more gypsum sorbent compounds in Step (II) to at least one injection point upstream of either the at least one particulate control device or the least one air heater.

2. The method of claim 1, wherein the combustion flue gas stream is in communication with at least one air heater and two or more pieces of emission control technology in communication with the flue gas stream comprise at least one particulate control device and at least one other piece of emission control technology, and wherein Step (III) is achieved by supplying the one or more gypsum sorbent compounds to at least two injection points that are individually upstream of the air heater and individually upstream of the at least one particulate control device.

3. The method of claim 1, wherein the combustion flue gas stream is in communication with at least one air heater and two or more pieces of emission control technology in communication with the flue gas stream comprise at least one particulate control device and at least one other piece of emission control technology, and wherein Step (III) is achieved by supplying the one or more gypsum sorbent compounds to at least two injection points that are individually upstream of the air heater and individually inside the at least one particulate control device.

4. The method of claim 1, wherein the combustion flue gas stream is in communication with at least one air heater and two or more pieces of emission control technology in communication with the flue gas stream comprise at least one particulate control device and at least one other piece of emission control technology, and wherein Step (III) is achieved by supplying the one or more gypsum sorbent compounds to at least two injection points that are individually upstream of the air heater and individually downstream of the at least one particulate control device.

5. The method of claim 1, wherein Step (II) is conducted at a temperature below about 900° F.

6. The method of claim 1, wherein Step (II) is conducted at a temperature in the range of about 750° F. to about 900° F.

7. The method of claim 1, wherein Step (II) is conducted at a temperature below about 400° F.

8. The method of claim 1, wherein at least the gas phase selenium concentration is reduced.

9. The method of claim 1, wherein at least the gas phase selenium and gas phase lead concentrations are reduced.

10. The method of claim 1, wherein at least the gas phase selenium and gas phase arsenic concentrations are reduced.

11. The method of claim 1, wherein at least the gas phase arsenic concentration is reduced.

12. The method of claim 1, wherein at least the gas phase arsenic and gas phase lead concentrations are reduced.

13. The method of claim 1, wherein the gas phase selenium, gas phase arsenic and the gas phase lead concentrations are reduced.

14. A method for reducing the amount and/or concentration of one or more gas phase selenium compounds and/or one or more other RCRA metals, or RCRA metal compounds compounds, in a combustion flue gas stream and/or in one or more pieces of emission control technology in communication with the flue gas stream, regardless of whether such other RCRA metals or RCRA metal compounds are in the gas phase or some other phase, the method comprising the steps of:

(A) supplying one or more gypsum sorbent compounds to one or more injection points in the combustion flue gas stream and/or one or more pieces of emission control technology combustion flue gas stream and/or in one or more pieces of emission control technology in communication with the flue gas stream;

(B) injecting the one or more gypsum sorbent compounds into the combustion flue gas stream and/or one or more pieces of emission control technology combustion flue gas stream and/or in one or more pieces of emission control technology in communication with the flue gas stream via the one or more injection points; and (C) reducing the amount and/or concentration in the combustion flue gas stream of the one or more gas phase selenium compounds and/or the one or more other RCRA metals, or RCRA metal compounds, regardless of whether such other RCRA metals or RCRA metal compounds are in the gas phase or some other phase by capturing, sequestering, binding and/or reacting the one or more gas phase selenium compounds and/or the one or more other RCRA metals, or RCRA metal compounds, on or with the one or more gypsum sorbent compounds, wherein the one or more pieces of emission control technology in communication with the flue gas stream comprise at least one particulate control device or at least one air heater and wherein Step (C) is achieved by supplying and injecting the one or more gypsum sorbent compounds in Step (B) to at least one injection point upstream of either the at least one particulate control device or the least one air heater.

15. The method of claim 14, wherein the combustion flue gas stream is in communication with at least one air heater and two or more pieces of emission control technology in communication with the flue gas stream comprise at least one particulate control device and at least one other piece of emission control technology, and wherein Step (C) is achieved by supplying the one or more gypsum sorbent compounds to at least two injection points that are individually upstream of the air heater and individually upstream of the at least one particulate control device.

16. The method of claim 14, wherein the combustion flue gas stream is in communication with at least one air heater and two or more pieces of emission control technology in communication with the flue gas stream comprise at least one particulate control device and at least one other piece of emission control technology, and wherein Step (C) is achieved by supplying the one or more gypsum sorbent compounds to at least two injection points that are individually upstream of the air heater and individually inside the at least one particulate control device.

17. The method of claim 14, wherein the combustion flue gas stream is in communication with at least one air heater and two or more pieces of emission control technology in communication with the flue gas stream comprise at least one particulate control device and at least one other piece of emission control technology, and wherein Step (C) is achieved by supplying the one or more gypsum sorbent compounds to at least two injection points that are individually upstream of the air heater and individually downstream of the at least one particulate control device.

18. The method of claim 14, wherein Step (B) is conducted at a temperature below about 900° F.

19. The method of claim 14, wherein Step (B) is conducted at a temperature in the range of about 750° F. to about 900° F.

20. The method of claim 14, wherein Step (B) is conducted at a temperature below about 400° F.

21. A method for reducing the amount and/or concentration of one or more selenium compounds, one or more arsenic compounds, one or more lead compounds and/or one or more other RCRA metals, or RCRA metal compounds, in a combustion flue gas stream and/or in one or more pieces of emission control technology in communication with the flue gas stream, regardless of whether any one or more of the selenium compounds, the arsenic compounds, the lead compounds or any of the other RCRA metals or RCRA metal compounds are in the gas phase or some other phase, the method comprising the steps of:

(a) supplying one or more gypsum sorbent compounds to one or more injection points in the combustion flue gas stream and/or one or more pieces of emission control technology combustion flue gas stream and/or in one or more pieces of emission control technology in communication with the flue gas stream;

(b) injecting the one or more gypsum sorbent compounds into the combustion flue gas stream and/or one or more pieces of emission control technology combustion flue gas stream and/or in one or more pieces of emission control technology in communication with the flue gas stream via the one or more injection points; and (c) reducing the amount and/or concentration in the combustion flue gas stream of the one or more selenium compounds, the one or more arsenic compounds, the one or more lead compounds and/or the one or more other RCRA metals, or RCRA metal compounds, regardless of whether such selenium compounds, such arsenic compounds, such lead compounds and/or such other RCRA metals or RCRA metal compounds are in the gas phase or some other phase by capturing, sequestering, binding and/or reacting the one or more selenium compounds, the one or more arsenic compounds, the one or more lead compounds and/or the one or more other RCRA metals, or RCRA metal compounds, on or with the one or more gypsum sorbent compounds, wherein the one or more pieces of emission control technology in communication with the flue gas stream comprise at least one particulate control device or at least one air heater and wherein Step (c) is achieved by supplying and injecting the one or more gypsum sorbent compounds in Step (b) to at least one injection point upstream of either the at least one particulate control device or the least one air heater.

22. The method of claim 21, wherein the combustion flue gas stream is in communication with at least one air heater and two or more pieces of emission control technology in communication with the flue gas stream comprise at least one particulate control device and at least one other piece of emission control technology, and wherein Step (c) is achieved by supplying the one or more gypsum sorbent compounds to at least two injection points that are individually upstream of the air heater and individually upstream of the at least one particulate control device.

23. The method of claim 21, wherein the combustion flue gas stream is in communication with at least one air heater and two or more pieces of emission control technology in communication with the flue gas stream comprise at least one particulate control device and at least one other piece of emission control technology, and wherein Step (c) is achieved by supplying the one or more gypsum sorbent compounds to at least two injection points that are individually upstream of the air heater and individually inside the at least one particulate control device.

24. The method of claim 21, wherein the combustion flue gas stream is in communication with at least one air heater and two or more pieces of emission control technology in communication with the flue gas stream comprise at least one particulate control device and at least one other piece of emission control technology, and wherein Step (c) is achieved by supplying the one or more gypsum-based sorbent compounds to at least two injection points that are individually upstream of the air heater and individually downstream of the at least one particulate control device.

* * * * *